United States Patent
Kwon et al.

(10) Patent No.: US 11,025,451 B2
(45) Date of Patent: Jun. 1, 2021

(54) GATEWAY PROCESSOR, CONTROL LOGIC FOR THE SAME, A PROGRAM, AND A RECORDING MEDIUM

(71) Applicants: HYUNDAI MOTOR COMPANY, Seoul (KR); KIA MOTORS CORPORATION, Seoul (KR); KYUNGSHIN CO., LTD., Incheon (KR)

(72) Inventors: Hae Yun Kwon, Bucheon-si (KR); Ji Heon Kwon, Seoul (KR); Jae Sung Bae, Incheon (KR); Jae Goo Jung, Suwon-si (KR)

(73) Assignees: HYUNDAI MOTOR COMPANY, Seoul (KR); KIA MOTORS CORPORATION, Seoul (KR); KYUNGSHIN CO., LTD., Incheon (KR)

( * ) Notice: Subject to any disclaimer, the term of this patent is extended or adjusted under 35 U.S.C. 154(b) by 134 days.

(21) Appl. No.: 16/444,573

(22) Filed: Jun. 18, 2019

(65) Prior Publication Data

US 2020/0195468 A1    Jun. 18, 2020

(30) Foreign Application Priority Data

Dec. 14, 2018    (KR) .................. 10-2018-0161603

(51) Int. Cl.
*H04L 12/40*    (2006.01)
*G06F 1/3206*    (2019.01)

(52) U.S. Cl.
CPC ...... *H04L 12/40039* (2013.01); *G06F 1/3206* (2013.01); *H04L 12/40013* (2013.01);
(Continued)

(58) Field of Classification Search
CPC ......... H04L 12/40039; H04L 12/40013; H04L 2012/40215; H04L 2012/40273; G06F 1/3206
See application file for complete search history.

(56) References Cited

U.S. PATENT DOCUMENTS

| | | | |
|---|---|---|---|
| 8,818,628 B2* | 8/2014 | Son | H04L 12/40 701/36 |
| 2013/0322449 A1* | 12/2013 | Hwang | H04L 45/50 370/392 |

(Continued)

OTHER PUBLICATIONS

C. Schmutzler, A. Krüger, F. Schuster and M. Simons, "Energy efficiency in automotive networks: Assessment and concepts," 2010 International Conference on High Performance Computing & Simulation, Caen, 2010, pp. 232-240. (Year: 2010).*

(Continued)

*Primary Examiner* — Glenn A. Auve
(74) *Attorney, Agent, or Firm* — Lempia Summerfield Katz LLC

(57) ABSTRACT

A gateway processor of a vehicle includes a controller area network (CAN) message receiver, an Ethernet message receiver, a vehicle state monitoring and recognition unit configured to receive a signal from the CAN message receiver and the Ethernet message receiver, and a power management determination unit for each state configured to receive a signal from the vehicle state monitoring and recognition unit. The gateway processor also includes an electronic control unit (ECU) power control application execution unit configured to receive a signal from the power management determination unit for each state.

15 Claims, 3 Drawing Sheets

(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 2015/0172298 A1* | 6/2015 | Otsuka .................. | H04L 63/123 726/30 |
| 2018/0076970 A1* | 3/2018 | Han ........................ | H04L 12/46 |
| 2018/0279098 A1* | 9/2018 | Kim ..................... | H04L 41/0246 |
| 2019/0103988 A1* | 4/2019 | Martin .............. | H04L 12/40013 |
| 2020/0114768 A1* | 4/2020 | Oestreich .................. | B60L 3/12 |
| 2020/0220888 A1* | 7/2020 | Terazawa .............. | B60L 3/0084 |
| 2020/0351123 A1* | 11/2020 | Haga ................... | H04L 12/4625 |

OTHER PUBLICATIONS

M. Postolache, G. Neamtu and S. D. Trofin, "CAN—Ethernet gateway for automotive applications," 2013 17th International Conference on System Theory, Control and Computing (ICSTCC), Sinaia, 2013, pp. 422-427. (Year: 2013).*

J. H. Kim, S. Seo, N. Hai, B. M. Cheon, Y. S. Lee and J. W. Jeon, "Gateway Framework for In-Vehicle Networks Based on CAN, FlexRay, and Ethernet," in IEEE Transactions on Vehicular Technology, vol. 64, No. 10, pp. 4472-4486, Oct. 2015. (Year: 2015).*

\* cited by examiner

GATEWAY PROCESSOR, CONTROL LOGIC FOR THE SAME, A PROGRAM, AND A RECORDING MEDIUM

CROSS REFERENCE TO RELATED APPLICATION

This application claims priority under 35 U.S.C. § 119 to Korean Patent Application No. 10-2018-0161603 filed in Korea on Dec. 14, 2018 which is hereby incorporated in its entirety by reference as if fully set forth herein.

BACKGROUND

Field of the Disclosure

Embodiments of the present disclosure relate to a gateway processor, a control logic for the same, a program, and a recording medium. More particularly, the disclosure relates to a gateway processor, a control logic for the same, a program, and a recording medium for flexibly controlling the power of a vehicle.

Discussion of the Related Art

In general, advanced technology has been applied to vehicles to enhance mobility and usefulness thereof. Accordingly, vehicles have become essential products in modern society.

According to recent trends, as in-vehicle safety/convenience functions are extensively applied, the number of electronic control units (ECUs) and the amount of power consumption in a vehicle has increased. A policy of carbon dioxide emission regulation for vehicles has been considered to be globally introduced in Europe, the U.S., and Asia. As a result, in the near future, the importance of fuel economy and power management for overcoming this issue will increase.

Power of a vehicle in a normal environment or in a complex environment that might be developed in the future, such as an autonomous driving environment, is controlled using a network applied to the vehicle. The network is implemented by a gateway connected to all in-vehicle networks.

ECUs installed in a vehicle are classified as ECUs to which power needs to be supplied, or as ECUs to which power supply may be turned off according to a vehicle state. Examples of vehicle states may include parking/driving, daytime/nighttime, low/high temperature, and driver manipulation. The ECUs are connected to a network.

SUMMARY

There is a need for a gateway processor to control such a plurality of ECUs and a control logic for the same.

Accordingly, the present disclosure is directed to a gateway processor for controlling a plurality of electronic control units (ECUs) included in a vehicle, a control logic for the same, a program, and a recording medium, that substantially obviate one or more problems due to limitations and disadvantages of the related art.

In one embodiment, a gateway processor of a vehicle includes a controller area network (CAN) message receiver, an Ethernet message receiver, a vehicle state monitoring and recognition unit configured to receive a signal from the CAN message receiver and the Ethernet message receiver, and a power management determination unit for each state. The power management determination unit is configured to receive a signal from the vehicle state monitoring and recognition unit. The gateway processor also includes an electronic control unit (ECU) power control application execution unit configured to receive a signal from the power management determination unit for each state.

The gateway processor of the vehicle may further include a plurality of CAN ID filters configured to transmit a signal to the CAN message receiver.

The gateway processor of the vehicle may further include a CAN database (DB) configured to transmit a signal to the CAN message receiver and the plurality of CAN ID filters.

The gateway processor of the vehicle may further include a plurality of CAN transceivers configured to transmit signals to the plurality of CAN ID filters, respectively.

The gateway processor of the vehicle may further include an Ethernet message filter configured to transmit a signal to the Ethernet message receiver.

The gateway processor of the vehicle may further include an Ethernet DB configured to transmit a signal to the Ethernet message receiver and the Ethernet message filter.

The gateway processor of the vehicle may further include a plurality of Ethernet physical transceivers (PHYs) configured to transmit a signal to the Ethernet message filter. The gateway processor may also include an Ethernet switch between the Ethernet PHYs and the Ethernet message filter.

In another embodiment, a control logic of a gateway processor of a vehicle includes receiving at least one of a vehicle controller area network (CAN) message or a vehicle Ethernet message. The control logic further includes determining whether vehicle state analysis necessity data is present in the received message, executing vehicle related determination logics from the vehicle state analysis necessity data, checking power control conditions of electronic control units (ECUs), and controlling power of the ECUs according to the checked power control conditions.

The vehicle related determination logics from the vehicle state analysis necessity data may include a surrounding environment determination logic, a driving state determination logic, and a vehicle state determination logic.

The surrounding environment determination logic may determine daytime/nighttime or high/low temperature.

The driving state determination logic may determine a parking state, a stop state, low-speed driving, or high-speed driving.

The vehicle state determination logic may be executed when a message corresponding to vehicle state change is received.

The control logic of the gateway processor may further include controlling power of the ECU according to the determining.

The determining may be performed according to a power control condition set by a user.

The controlling power of the ECU may be one of power on, power off, or power sleep.

In another embodiment, a computer readable recording medium has recorded thereon a program for executing the aforementioned control logic of the gateway processor by a processor.

In another embodiment, a computer readable recording medium has recorded thereon the aforementioned program.

BRIEF DESCRIPTION OF THE DRAWINGS

Arrangements and embodiments may be described in detail with reference to the following drawings in which like reference numerals refer to like elements and wherein.

DETAILED DESCRIPTION OF THE DISCLOSURE

The following methods and vehicle controllers according to embodiments of the present disclosure are described in more detail with reference to the accompanying drawings. Terms used therein are used only for illustrative purposes and are not intended to limit the scope of the embodiments.

The term "comprises", "includes", "arrange", or "has" described herein should be interpreted not to exclude other elements but to further include such other elements since the corresponding elements may be included unless mentioned otherwise.

The singular expressions including "the" in the present specification and claims include the plural expressions unless clearly specified otherwise in context. In addition, the term "and/or" includes any and all combinations of one or more of the associated listed items.

A gateway processor, a control logic for the same, a program, and a recording medium according to various embodiments are not limited to a vehicle and may be used in vehicles moveable with a predetermined speed other than an automobile. Examples of other vehicles may include a two-wheeled vehicle, an electric bicycle, an airplane in a hangar, and the like.

Figure 1:
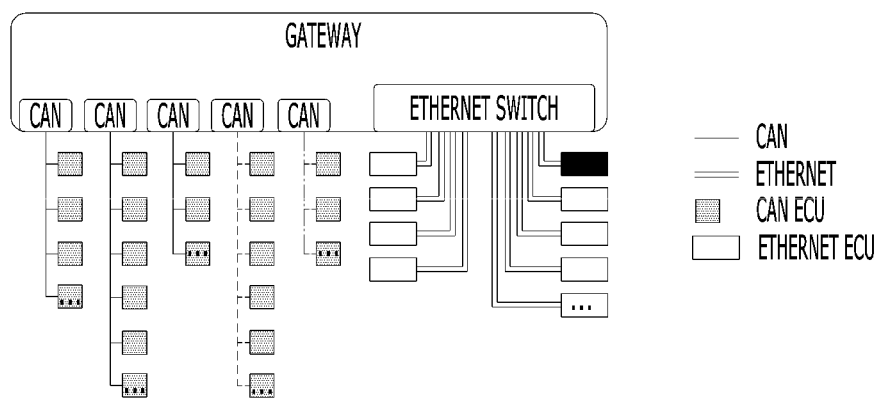
FIG. 1 is a diagram showing a gateway of a vehicle according to an embodiment.

FIG. 1 is a diagram showing a gateway of a vehicle according to an embodiment of the present disclosure. In the vehicle, a plurality of messages included in a controller area network (CAN) or Ethernet communication messages mainly includes a vehicle control message between electronic control units (ECUs), a state message, and the like. A gateway may determine a state, driving information, and the surrounding environment of the vehicle from collected communication data.

An ECU that is connected through a communication line such as CAN communication or Ethernet may be connected to a gateway for controlling/monitoring vehicular communication. In this case, the CAN applied to a vehicle may control a power mode of the ECU through a CAN message. The Ethernet may control a power mode through port energy.

Figure 2:
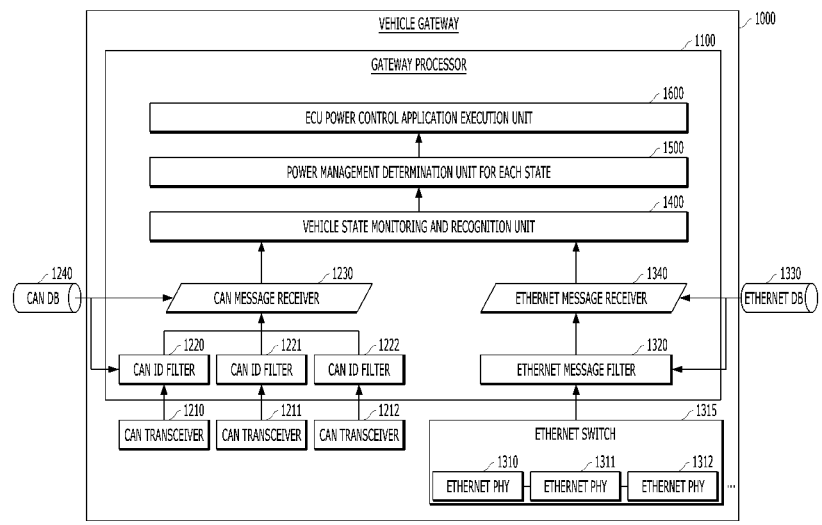
FIG. 2 is a diagram showing a gateway processor according to an embodiment.

FIG. 2 is a diagram showing a vehicle gateway 1000 having a gateway processor according to an embodiment of the present disclosure.

A gateway processor 1100 of a vehicle gateway 1000 according to an embodiment may include a CAN message receiver 1230, an Ethernet message receiver 1340, and a vehicle state monitoring and recognition unit 1400 for receiving a signal from the CAN message receiver and the Ethernet message receiver. The gateway processor 1100 may further include a power management determination unit for each state 1500 for receiving a signal from the vehicle state monitoring and recognition unit. The gateway processor 1100 may also include an ECU power control application execution unit 1600 for receiving a signal from the power management determination unit for each state 1500.

The gateway processor 1100 of the vehicle gateway 1000 may further include a plurality of CAN ID filters 1220 to 1222 for transmitting a signal to the CAN message receiver 1230. The gateway processor 1100 may further include a CAN database (DB) 1240 for transmitting a signal to the CAN message receiver 1230 and the plurality of CAN ID filters 1220 to 1222. The gateway processor 1100 may also include a plurality of CAN transceivers 1210 to 1212 for transmitting signals to the CAN ID filters 1220 to 1222, respectively. The gateway processor 1100 may further include an Ethernet message filter 1320 for transmitting a signal to the Ethernet message receiver 1340. The gateway processor 1100 may also include an Ethernet DB 1330 for transmitting a signal to the Ethernet message receiver 1340 and the Ethernet message filter 1320. The gateway processor 1100 may further include a plurality of Ethernet PHYs 1310 to 1312 for transmitting a signal to the Ethernet message filter 1320, and an Ethernet switch 1315 between the Ethernet PHYs 1310 to 1312 and the Ethernet message filter 1320.

In this embodiment, the CAN transceivers 1210 to 1212 may transmit and receive CAN data. The CAN ID filter 1222 may filter a predefined CAN message. The CAN message receiver 1230 may receive a reception message via CAN data communication. The Ethernet switch 1315 may include the Ethernet PHYs 1310 to 1312 for transmission and reception via the Ethernet. The Ethernet message filter 1320 may separate only a vehicle state-related message among Ethernet messages. In this embodiment, according to the message received through CAN or Ethernet communication, a vehicle state may be determined. When power of each ECU needs to be controlled, a command for power transition of a corresponding controller may be executed.

Figure 3:
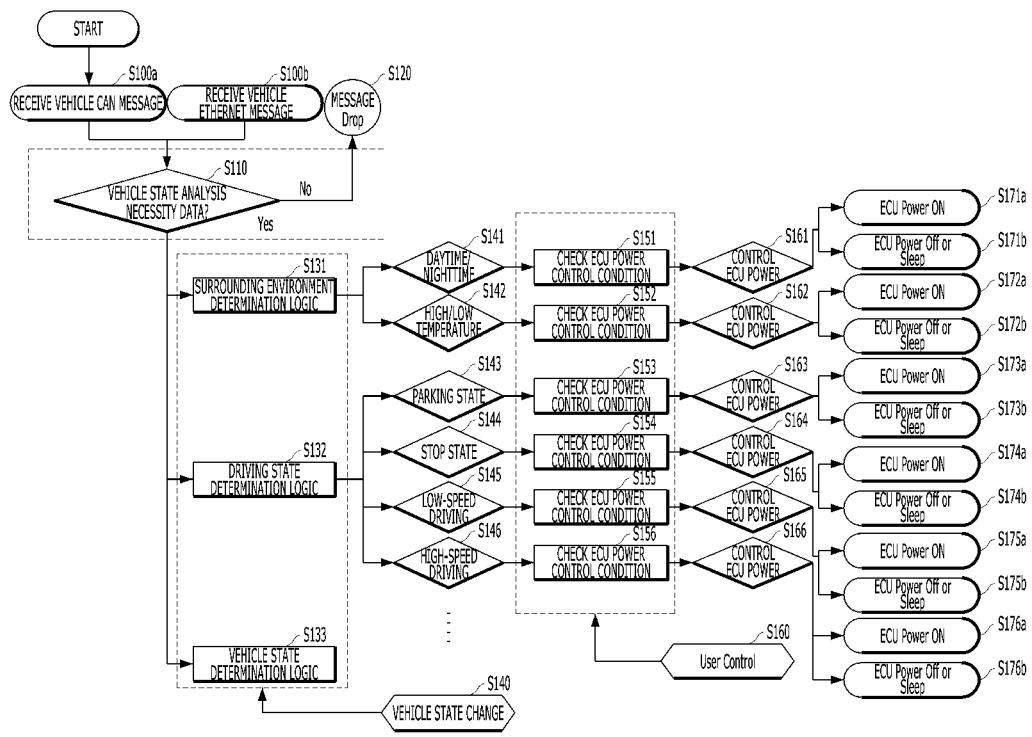
FIG. 3 is a diagram showing a control logic of the gateway processor of the vehicle of FIG. 2.

FIG. 3 is a diagram showing a control logic of the gateway processor 1100 of the vehicle gateway 1000 of FIG. 2. Hereinafter, the control logic of the gateway processor 1100 of the vehicle gateway 1000 according to an embodiment is described with reference to FIG. 3.

The control logic of the gateway processor of the vehicle according to an embodiment may firstly receive a vehicle CAN message (S100a) or may receive at least one vehicle Ethernet message (S100b). Whether vehicle state analysis necessity data is present in the received message may be determined (S110). When the vehicle state analysis necessity data is not present in the received message (No), the message may be deleted (S120). When the vehicle state analysis necessity data is included in the received message (Yes), the vehicle related determination logics from the vehicle state analysis necessity data may be executed.

Power control conditions of ECUs may be checked, and power of the ECUs may be controlled according to the checked power control conditions.

In this embodiment, the vehicle related determination logics from the vehicle state analysis necessity data may include, for example, a surrounding environment determination logic S131, a driving state determination logic S132, and a vehicle state determination logic S133. In this case, the vehicle state determination logic S133 may be executed when a message corresponding to the vehicle state change S140 is received.

The surrounding environment determination logic S131 may determine daytime/nighttime S141 or high/low temperature S142. The driving state determination logic S132 may determine a parking state S143, a stop state S144, low-speed driving S145, or high-speed driving S146.

According to the aforementioned determination of the vehicle related determination logics from the vehicle state analysis necessity data, power of an ECU may be controlled. In this embodiment, the above determination may be performed according to a power control condition S160 set by a user. In other words, an ECU power control condition set by the user may be checked (S151-S156), and ECU power control S161-S166 may be performed according to the ECU power control condition. Each ECU power control S161-S166 may be performed in one of a power on (S171a-S176a) mode, a power off (S171b-S176b) mode, or a power sleep (S171b-S176b) mode.

The aforementioned control logic of the gateway processor may be recorded on a computer readable recording medium. In this embodiment, the control logic may be recorded as a program for executing the control logic of the gateway processor, by a processor.

Figure 4:
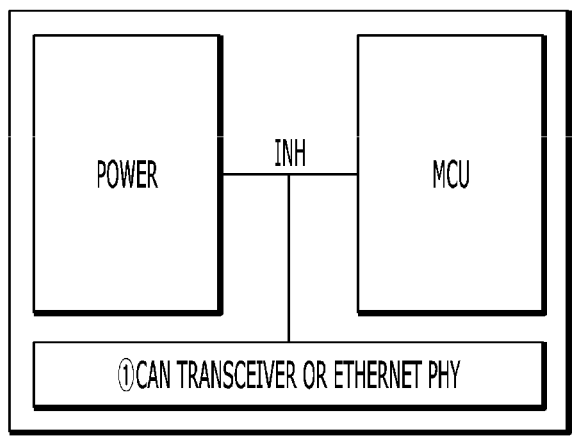
FIG. 4 is a diagram showing an electronic control unit (ECU) that is controlled through the gateway processor of the vehicle of FIG. 2.

FIG. 4 is a diagram showing an ECU that is controlled through the gateway processor 1100 of the vehicle gateway 1000 of FIG. 2.

A controller employing CAN may be provided with a sleep function in a CAN transceiver. When the controller receives specific data (wake up pattern), power may be turned on, or a microcontroller unit (MCU) in a sleep state may transition to a normal mode. In addition, a controller employing Ethernet may perform the same function as the CAN through an Ethernet PHY. In FIG. 4, INH means inhibit output.

The illustrated gateway may analyze a message of a connected network, may determine a current driving condition of a vehicle and a user operation, and may control power of a corresponding ECU according to a predefined power control scenario. In addition, in a power control method of each ECU, a gateway may transmit a sleep command to a corresponding ECU. The ECU that receives the sleep command may autonomously enter a sleep mode corresponding to a network standby state. Accordingly, functions configured for each of the plurality of ECUs and current amounts of power consumed for the respective semiconductors are different. However, during transition into a sleep mode, the ECU enters a network standby mode in which only several microamperes of power are consumed. Thereby, the current consumption is significantly reduced.

Accordingly, power of a vehicle may be flexibly controlled. Although it is not possible to change a conventional vehicle power control due to static configuration thereof after initial vehicle design, since it is possible to control power for each of the various scenarios using a network without additional costs, power may be actively controlled. Thus, when power consumption in a vehicle is lowered, fuel efficiency may be increased and harmful substances such as exhaust gas may be prevented.

Figure 5A:
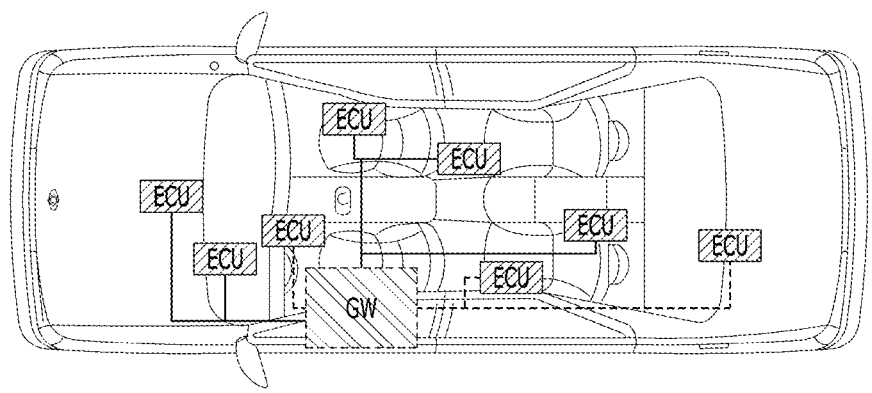
FIGS. 5A-5C are diagrams showing power control in a vehicle via a control logic of the gateway processor of the vehicle of FIG. 4.
Figure 5B:
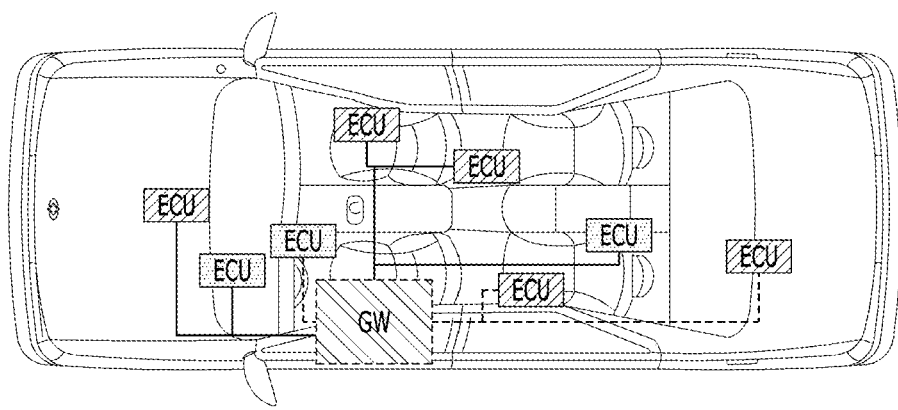
Figure 5C:
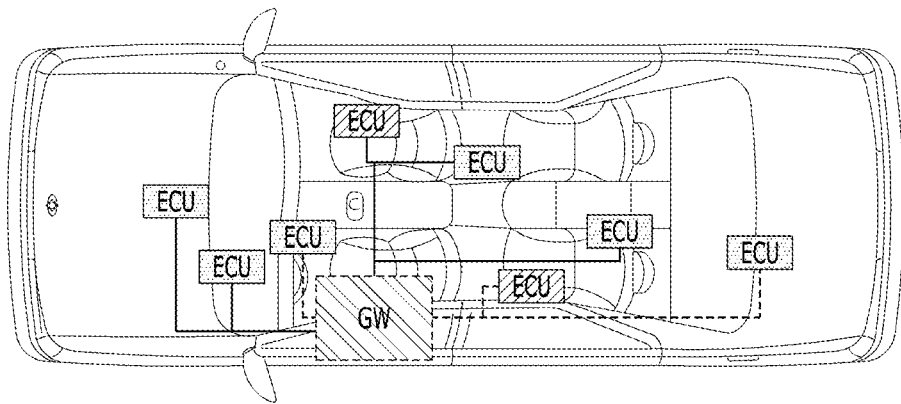

FIGS. 5A-5C are diagrams showing examples of power control in a vehicle via a control logic of the gateway processor 1100 of the vehicle gateway 1000 (GW) of FIG. 4.

In FIGS. 5A-5C, the vehicle includes a plurality of ECUs. In this embodiment, an ECU indicated by no cross-hatching is a non-active ECU, an ECU indicated by cross-hatching is an active ECU, CAN communication is indicated by a solid line between the gateway GW and an ECU, and Ethernet communication is indicated by a dotted line between the gateway GW and an ECU.

According to an embodiment, the gateway processor, the control logic for the same, the program, and the recording medium may flexibly control the power of a vehicle. It is difficult or not possible to change conventional power control in a vehicle due to a static configuration thereof after initial vehicle design. However, since it is possible to control the power for each of various scenarios using a network without additional costs, power may be actively controlled. Thus, when power consumption in a vehicle is lowered, fuel efficiency may be increased and harmful substances such as exhaust gas may be prevented.

It will be apparent to those having ordinary skill in the art that various modifications and variations can be made in the present disclosure without departing from the spirit or scope of the present disclosure.

Thus, it is intended that the present disclosure cover the modifications and variations of the present disclosure provided they come within the scope of the appended claims and their equivalents.

What is claimed is:

1. A gateway processor of a vehicle, comprising:
   a controller area network (CAN) message receiver;
   an Ethernet message receiver;
   a vehicle state monitoring and recognition unit configured to receive a signal from the CAN message receiver and a signal from the Ethernet message receiver;
   a power management determination unit for each state of a plurality of vehicle states, the power management determination unit configured to receive a signal from the vehicle state monitoring and recognition unit; and
   an electronic control unit (ECU) power control application execution unit configured to receive a signal from the power management determination unit for each state of the plurality of vehicle states.

2. The gateway processor of the vehicle of claim 1, further comprising a plurality of CAN ID filters configured to transmit a signal to the CAN message receiver.

3. The gateway processor of the vehicle of claim 2, further comprising a CAN database (DB) configured to transmit a signal to the CAN message receiver and the plurality of CAN ID filters.

4. The gateway processor of the vehicle of claim 2, further comprising a plurality of CAN transceivers configured to transmit signals to the CAN ID filters, respectively.

5. The gateway processor of the vehicle of claim 1, further comprising an Ethernet message filter configured to transmit a signal to the Ethernet message receiver.

6. The gateway processor of the vehicle of claim 5, further comprising an Ethernet DB configured to transmit a signal to the Ethernet message receiver and the Ethernet message filter.

7. The gateway processor of the vehicle of claim 5, further comprising:
   a plurality of Ethernet physical transceivers (PHYs) configured to transmit a signal to the Ethernet message filter; and
   an Ethernet switch between the Ethernet PHYs and the Ethernet message filter.

8. A control logic method comprising:
   receiving, by a gateway processor of a vehicle, at least one of a vehicle controller area network (CAN) message or a vehicle Ethernet message;
   determining, by the gateway processor, whether a vehicle state analysis necessity data is present in the received message;
   upon determining that the vehicle state analysis necessity data is present in the received message, executing, by the gateway processor, vehicle related determination logics, wherein the vehicle related determination logics include a surrounding environment determination logic, a driving state determination logic, and a vehicle state determination logic;

checking, by the gateway processor, power control conditions of electronic control units (ECUs); and controlling, by the gateway processor, power of the ECUs according to the checked power control conditions.

9. The control logic method of claim 8, wherein the surrounding environment determination logic comprises determining, by the gateway processor, daytime or nighttime.

10. The control logic method of claim 9, further comprising controlling, by the gateway processor, power of the ECUs according to the determining.

11. The control logic method of claim 9, wherein the determining is performed, by the gateway processor, according to a power control condition set by a user.

12. The control logic method of claim 10, wherein the controlling power of the ECUs is one of power on, power off, or power sleep.

13. The control logic method of claim 8, wherein the driving state determination logic comprises determining, by the gateway processor, a parking state, or a stop state.

14. The control logic method of claim 8, wherein the vehicle state determination logic is executed when a message corresponding to vehicle state change is received.

15. A non-transitory computer readable recording medium storing a program including instructions that, when executed by a gateway processor, causes the gateway processor to:

receive at least one of a vehicle controller area network (CAN) message or a vehicle Ethernet message;

determine whether a vehicle state analysis necessity data is present in the received message;

upon determining that the vehicle state analysis necessity data is present, execute vehicle related determination logics, wherein the vehicle related determination logics include a surrounding environment determination logic, a driving state determination logic, and a vehicle state determination logic;

check power control conditions of electronic control units (ECUs); and control power of the ECUs according to the checked power control conditions.

* * * * *